United States Patent [19]

Holtzman et al.

[11] 4,344,105
[45] Aug. 10, 1982

[54] POWER CAPACITOR STRUCTURE AND METHOD OF ASSEMBLY

[75] Inventors: Barry L. Holtzman, Richland Township, Monroe County; George E. Mercier, Bloomington; Peter H. Thiel, Bloomington; James N. Santilli, Bloomington, all of Ind.

[73] Assignee: Westinghouse Electric Corp., Pittsburgh, Pa.

[21] Appl. No.: 216,215

[22] Filed: Dec. 12, 1980

[51] Int. Cl.³ .............................................. H01G 4/38
[52] U.S. Cl. .................................. 361/328; 29/25.42; 361/303; 361/307; 361/314
[58] Field of Search ............... 361/328, 329, 303, 307, 361/314; 29/25.42

[56] References Cited

U.S. PATENT DOCUMENTS 1,915,692  6/1933  Pickard ............................... 361/329
1,938,792 12/1933  Bailey ............................. 361/329 X
2,773,226 12/1956  Brooks ................................ 361/329

Primary Examiner—Elliot A. Goldberg
Attorney, Agent, or Firm—G. H. Telfer

[57] ABSTRACT

A power capacitor and method of making it employs the technique of stacking capacitor sections together in an enclosure of which each section includes rolled electrode foils and dielectric layers of which at least one of the electrodes has a rolled edge resulting in a greater thickness in that portion of the section. In order to permit thorough impregnation of the section, the winding tension is deliberately made loose and the initially resulting section is insufficiently tight to retain conductive tabs reliably in contact with the foil electrodes. The stacked sections have, however, between them in the body portion intermediate the rolled edges, one or more sheets of material that compress the body portion and insure reliable pressure contact thereat while not interfering with the impregnation of the fluid throughout the section.

4 Claims, 5 Drawing Figures

POWER CAPACITOR STRUCTURE AND METHOD OF ASSEMBLY

BACKGROUND AND SUMMARY OF THE INVENTION

This invention relates to electrical capacitors, particularly for high power applications, that include a plurality of capacitor sections that are individually wound and stacked together in an enclosure with electrical interconnections therebetween and to the terminals of the enclosure.

A capacitor unit for relatively high power applications normally comprises within a single enclosure a plurality of capacitor sections that are mutually interconnected in parallel and/or series combination to achieve the desired capacitance. In conventional commercial practice the capacitor sections are formed individually by rolling on a mandrel sheets of dielectric material and electrode foil material. During the winding process, tabs of conductive material are inserted adjacent the foil electrodes so that merely by pressure contact with the electrodes a conductive interconnection is made between sections. A description of such practice is, for example, contained in copending Application Ser. No. 092,869, filed Nov. 8, 1979 and assigned to the present assignee by Holtzman, now U.S. Pat. No. 4,307,434, issued Dec. 22, 1981, which is herein incorporated by reference. It is apparent that the practice of such technique requires a certain minimum pressure or force to be applied in the wound section to establish reliable electrical contact between the conductive tabs and their adjacent foil electrodes.

It has heretofore been known, see for example Yagatani et al application Ser. No. 724,295, filed Sept. 17, 1976, now abandoned, and Japanese Utility Model Patent Publication No. 8,917/1969, published Apr. 11, 1969 by Iwama et al, that improved electrical stress handling capability can be achieved by the utilization of a rolled edge foil as at least one of the capacitor electrodes. Advantageous use of this technique has been achieved, particularly in combination with a second wide and unrolled edge foil. However, certain problems in the practical manufacturing of such capacitors may result because of dimensional variations that occur across the length of the wound sections.

It has been proposed to have electrodes with folds at the edges with the electrode material folded completely over itself so the section thickness remains uniform throughout, for example as disclosed in published Japanese Published patent application 45-6359 of Mar. 30, 1970 by Iwama et al. Such an arrangement introduces some fabricational complexity in handling the extra folded material as well as extra cost for that material. We are here concerned with rolled edge foil electrodes that result in an increased thickness over a short distance at the electrode edges, such as about 0.375 in. at each edge of a section of about 20 in. in width (i.e. from end to end of the wound section), while the intermediate portion of the section has only a single thickness of each of the foil electrodes.

A growing interest in the art has developed to make capacitors with maximum usage of plastic film material such as polypropylene. In some instances such a film is used as a dielectric spacer in combination with one or more sheets of capacitor grade paper. The combination of the film with paper has the desirable aspect of facilitating thorough impregnation of the entire section, including the film, as the paper layer tends to act as a wick carrying fluid to the interior of the section. While effective capacitors are made employing combinations of film and paper, it is increasingly desirable to maximize the quantity of film in relation to paper, and preferably to avoid the use of paper altogether to provide an all film capacitor, in order to achieve a reduction of size and cost in comparison with equivalently rated film-paper units. The use of the rolled edge technique contributes to the achievement of greatest rating from the smallest size sections. Where a capacitor's dielectric spacer comprises a relatively large amount of film in comparison to paper, and particularly one which is of all film, there is a practical drawback on the ability to achieve thorough impregnation with rolled edge electrical foils.

The extra thickness resulting from the folded or rolled foil edge accumulates in the rolled section so there is a substantial and noticeable greater thickness of the section at the rolled edge than at the center of the section. This was found unobjectionable in making capacitors in which the dielectric spacer was a composite of a layer of film, a layer of paper, and a layer of film. However, in going to all film capacitors, a wound section formed in the previous manner was found to be subject to a practical difficulty. If the tension on the sheet materials being wound was maintained, in an all film winding, the same as that previously used in a film-paper-film winding it was found that finished units after impregnation when tested, by subjecting them to overvoltages, exhibited some failures. When such test units were opened and the sections examined internally, it was found that the liquid impregnant had not reached all portions of the capacitor sections and that particularly areas of the film layers at or proximate to the rolled edge were dry or were less than thoroughly impregnated, apparently accounting for electrical failure at those portions.

Thorough study of a number of such test units has developed an understanding that the winding tension applied to the sheets of material formed into the winding was such that the pressure or force on the section at the rolled edge was so great that a constriction occurred that prevented impregnating fluid from penetrating and reaching all parts of the film layers. Acting on this understanding, it was experimentally determined that if the tension on the layers being wound was lessened to an extent that the thorough impregnation of the dielectric fluid was insured, there was resulting impairment of the security of the conductive tabs inserted in the sections for interconnections. Consequently, the problem was then identified as one of insuring that the pressure at the rolled edge did not exceed that which would permit thorough impregnation and that the pressure throughout the section was sufficient to maintain reliable contact of the conductive tabs.

In accordance with this invention, the problem is solved by winding a capacitor section in a manner so that the roll is loose enough to provide for thorough liquid impregnation and completing the section in that manner with the conductive tabs in place but without necessarily their firm adherence within the section. Then as the sections are stacked closely together within an enclosure, or can, to form a finished unit there are placed one or more pieces of sheet material between adjacent sections dimensioned to fill space and apply additional pressure intermediate the portions of the sections at which the rolled edges occur. This compacts the interior section portions in which a substantial portion of the conductive tabs are disposed. The stacked capacitor sections in the finished unit thus have pressure on them that at the electrode edge portions is sufficiently light so that insulating fluid substantially completely impregnates the dielectric layers throughout the sections including the portions in the vicinity of the rolled edge and pressure intermediate the electrode edge portions is sufficiently great so the conductive tabs within the sections are in reliable pressure contact with their adjacent foil electrodes. The increase in pressure in the intermediate portions of the sections is not so great as to interfere with impregnation of those portions.

The capacitor so formed has been found to be successful in retaining the advantage of the rolled edge as far as the electrical stress capability of the unit is concerned because the rolled edge can now be used with assurance of thorough impregnation, even in all film units, while at the same time insuring secure location of the conductive tabs. Yet this results from a simple to practice technique.

As has been indicated above, the practice of the invention is particularly desirable in capacitors in which the dielectric is of all film material or, in general, of material of low porosity compared to capacitor grade paper.

In the practice of this invention, the intermediate sheet material between the sections preferably extends over between about 80% and 90% of the distance between the rolled edge portions of the sections. The sheet material preferably comprises substantially incompressible material such as pressed hardboard or a firm plastic sheet in a thickness that is between about 5% and 10% of the rolled section thickness.

As will be apparent from the following description, the means employed for selectively compressing the intermediate portions of the sections can take forms other than the sheet material described above.

DESCRIPTION OF THE PREFERRED EMBODIMENTS

Figure 1:
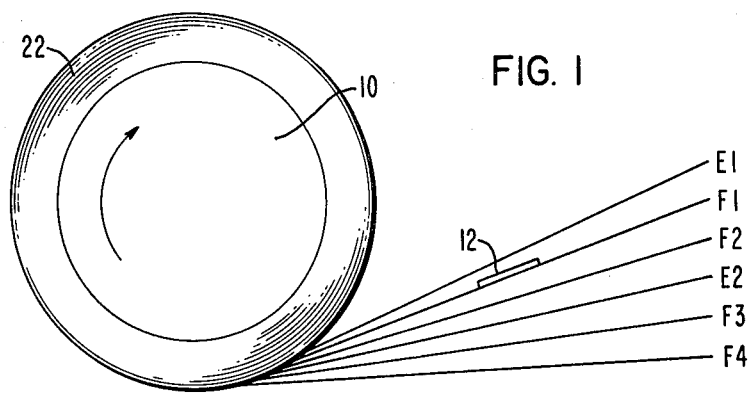
FIG. 1 is a schematic view generally illustrating the formation of a capacitor winding and placement of conductive interconnection elements therein.

Referring to FIG. 1, there is illustrated the general technique for winding a power capacitor section. A mandrel 10 is turned to wind sheets including a first electrode foil E1 of, for example, aluminum foil material, a pair of dielectric layers F1 and F2, such as, for example, a film such as polypropylene, a second electrode E2 such as of aluminum foil, and additional dielectric layers of film material F3 and F4. Within the sheet materials there is inserted a conductive tab 12 for pressure contact in the finished roll with the electrode E1. Elsewhere in the section, not shown, there would be inserted a conductive tab for contact with electrode E2.

Figure 2:
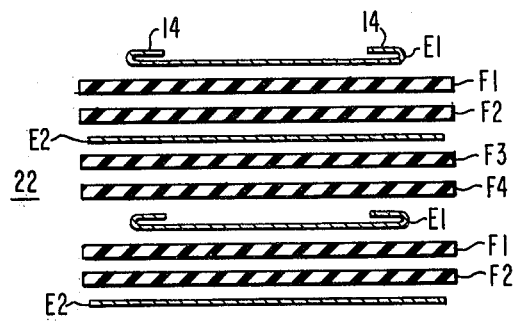
FIG. 2 is a cross-sectional view of part of a capacitor section.

In the finished winding, of which a partial sectional view is schematically shown in FIG. 2, dielectric layers F1 and F2 are on one side of electrode E1 and between it and electrode E2 while the dielectric layers F3 and F4 are on the other side of E1 between it and E2. A typical capacitor section may have about 100 turns of the six sheet materials (typically of about ten feet in length) applied around the mandrel 10.

Figure 3:
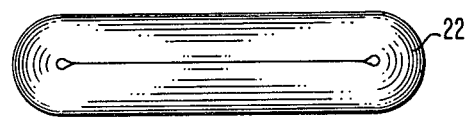
FIG. 3 is an end view of a capacitor section.
Figure 4:
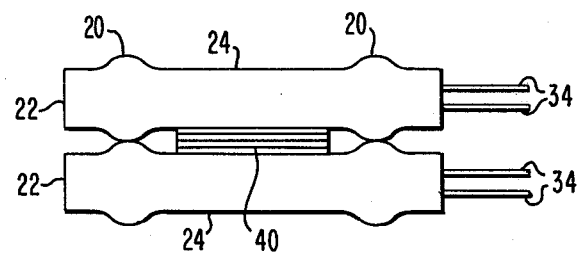
FIG. 4 is a longitudinal view of a pair of capacitor sections assembled in accordance with this invention; and, FIG. 5 is a partial end view of an assembled capacitor in accordance with this invention.

In this exemplary embodiment, the foil electrode E1 has a folded or rolled edge 14 and foil E2 has straight edges, generally in accordance with above-mentioned application Ser. No. 724,925. When the wound section 22 is taken from the mandrel 10, it is not supported in its center and it becomes flatter in end cross section as illustrated by its oval shape in FIG. 3. The section 22 assumes an overall shape as indicated in FIG. 4 in which the buildup of thickness as occurs from the utilization of a rolled edge 14 at each edge of one of the electrodes such as E1 is apparent at portions 20. Necessarily, the rolled edge portions 20 of the sections 22 are thicker in solid materials by the number of winding turns times the thickness of the foil layer than is the intermediate portion 24 of the section. So for a winding including the six sheet materials, the thickness of the rolled edge portions 20 is roughly 16% greater than the intermediate portions 24.

Figure 5:
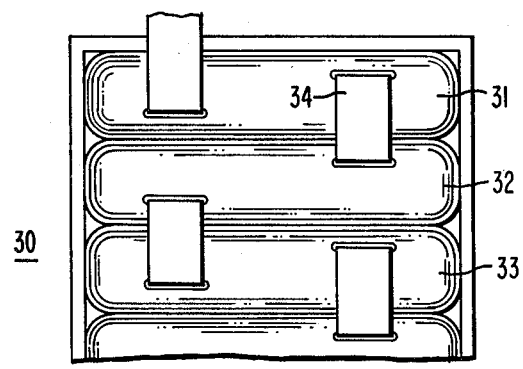

FIG. 5 shows a capacitor unit 30 with adjacent sections 31, 32 and 33 with conductive interconnections 34 therebetween.

In accordance with this invention the winding is carried out such that the tension on the foil and film materials permits a loose enough structure so that a liquid impregnant, with which the unit 30 is filled in accordance with known practice, can fully impregnate the sections including the portions 20 in the vicinity of the rolled edges. In order to insure that the conductive tab interconnections 34 are not loose and subject to withdrawal, there is provided between adjacent sections as they are stacked in the unit and as shown in FIG. 4 one or more pieces of sheet material 40 intermediate the rolled edge portion 20 so that the stacked sections have this additional material to force the intermediate portions 24 of the sections 22 together and to securely retain the conductive tabs 34.

It has been found in practice that when rolling a section with the degree of tension preferred in accordance with this invention to insure resulting impregnability that firm retention of the conductive tabs is jeopardized. However, by stacking the sections in accordance with this invention, the intermediate sheet material 40 results in firmly holding the tabs 34.

One way in which the invention can be described is with reference to what is referred to as space factor. Space factor may be defined as the distance between the aluminum foil electrodes divided by the thickness of the dielectric material between those electrodes. If this number is greater than unity, there are some gaps or voids in the structure. The space factor cannot be made exactly unity in all film capacitors or the dielectric strength at the foil edges where the rolled end double thickness electrode occurs is unacceptably low due to failure of sufficient impregnation. However, space factor cannot be made too high or current carrying pressure contact tabs will be too loose and will lead to capacitor failure due to contact arcing. By the practice of the present invention there is provided a relatively high foil edge space factor and a relatively low body space factor. This has been determined to be the most effective means of achievement of these relative space factors because of its ease of application in a manufacturing process without requiring any particular high degree of operator skill. On the other hand, considerations of employing additional sheets of material within the sections, narrower than the folded electrode, or otherwise treating the body material to buildup thickness therein undesirably complicates the manufacturing process and is unfavorable. Applying a banding that encircles the sections (either an individual section or a plurality banded together) in the body portion 24 in order to apply additional pressure to the body is less preferred than using the sheet material between adjacent sections because the latter is quicker and simpler to apply.

It is therefore seen that the present invention provides a simple technique for accomplishing the divergent objectives of achieving thorough impregnation in all film capacitors while retaining sufficient pressure for reliable contact with conductive tabs in capacitors in which the sections have dimensional variance due to the use of the rolled edge technique.

We claim:

1. A power capacitor comprising:
   a plurality of capacitor sections stacked together in an enclosure with a set of electrical interconnections between sections and terminals extending through said enclosure to the exterior thereof, said enclosure containing an insulating fluid that fills space around said sections and impregnates said sections;
   each of said sections comprising a capacitor winding including first and second foil electrodes with first and second dielectric layers on respective sides of said electrodes, said dielectric layers each including one or more sheets of film material, said first foil electrode having rolled edges so a double thickness of said first electrode occurs in the wound sections at the rolled edges;
   said electrical interconnections between said sections comprising conductive tabs located within said sections and making solely pressure contact with said foil electrodes,
   means for lessening pressure differences on portions of said stacked together capacitor sections as would otherwise result from the extra thickness of said first electrode edges, said means including by locating one or more pieces of sheet material between adjacent sections intermediate the electrode edge portions thereof, said sheet material being so dimensioned in accordance with its compressibility to result in said stacked capacitor sections having a pressure thereon at said electrode edge portions that is sufficiently light so said insulating fluid substantially completely impregnates said dielectric layers throughout the sections and a pressure thereon intermediate said electrode edge portions that is sufficiently greater so said conductive tabs within sections are in reliable pressure contact with their adjacent foil electrodes.

2. A power capacitor in accordance with claim 1 wherein:
   said dielectric layers consist of all film material of low porosity.

3. A power capacitor in accordance with claim 1 wherein:
   said sheet material comprises substantially incompressible material in a thickness that is between about 5% and 10% of the section thickness.

4. A method of assembling fluid impregnated power capacitor that has a plurality of stacked sections each including a plurality of layers of foil electrode material and dielectric sheet material of which a layer of foil electrode material has a rolled edge of increased thickness and the dielectric sheet material is of plastic film material, the steps comprising:
   winding the layers of foil electrode and dielectric material together to form a section with conductive tabs inserted adjacent each of the foil electrode layers, the winding being performed while tensioning the materials to an extent that a subsequently applied fluid impregnant can fully impregnate the materials; and
   stacking at least two sections, as individually made by said winding operation, adjacent each other in an enclosure with a pressure application means for applying pressure on said sections only intermediate the rolled edge portions for increasing the pressure in such intermediate portions to an extent sufficient to ensure reliable pressure contact of the conductive tabs while pressure at the rolled edge portions is sufficiently low to permit reliable fluid impregnation.

* * * * *